(No Model.)
T. J. BUSH.
LOCKING BOLT.
No. 257,287.  Patented May 2, 1882.
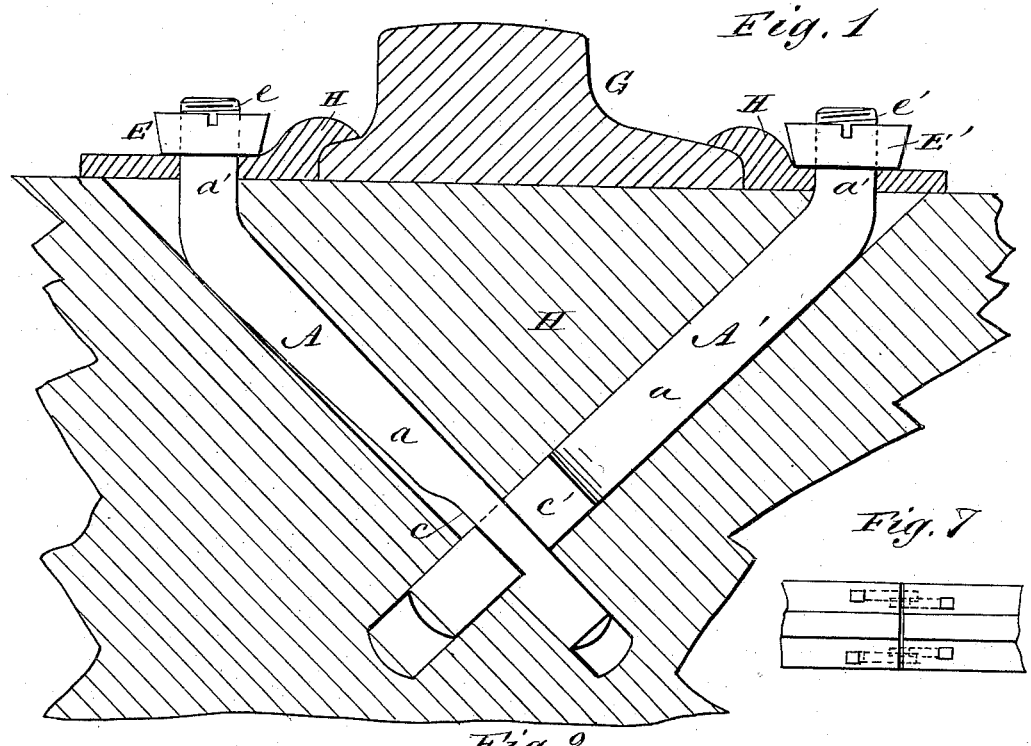
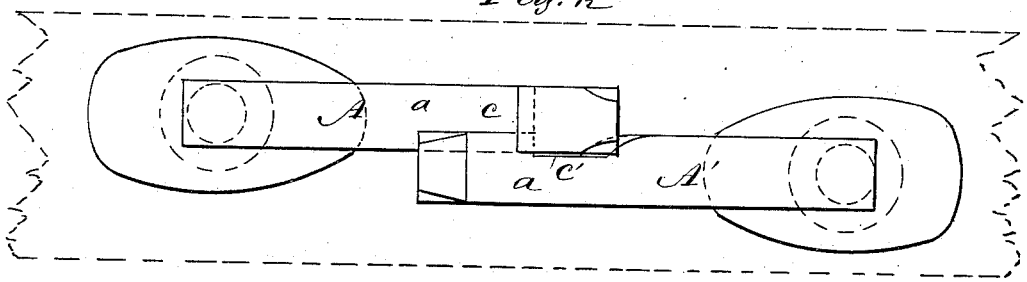
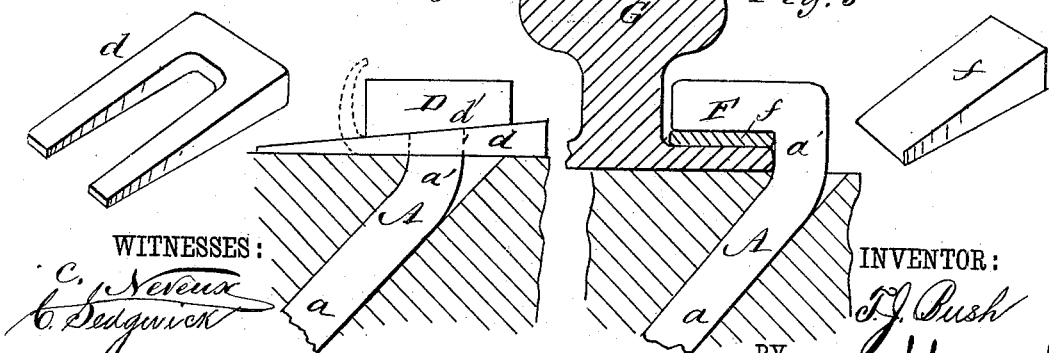
WITNESSES:
C. Neveux
C. Sedgwick
INVENTOR:
T. J. Bush
BY
ATTORNEYS.

United States Patent Office.

THOMAS J. BUSH, OF LEXINGTON, KENTUCKY.

LOCKING-BOLT.

SPECIFICATION forming part of Letters Patent No. 257,287, dated May 2, 1882.

Application filed September 14, 1881. (No model.)

*To all whom it may concern:*

Be it known that I, THOMAS J. BUSH, of Lexington, in the county of Fayette and State of Kentucky, have invented a new and useful Improvement in Locking-Bolts, of which the following is a full, clear, and exact description.

This invention consists of novel and improved locking-bolts for railroad-rails and for other purposes.

Reference is to be had to the accompanying drawings, forming part of this specification, in which similar letters of reference indicate corresponding parts in all the figures.

Figure 1 illustrates my improved bolts as they appear when locked in the cross-tie for holding an ordinary railroad-rail. Fig. 2 is a bottom view of the same. Figs. 3 and 5 show modifications of the head of the bolts, and Figs. 4 and 6 are perspective views of wedges used for tightening the bolts; and Fig. 7 shows the method of bolting horse-car rails.

In the drawings, A and A' represent the bolts, which are bent in such manner as to form the longer diagonal arm or main portions $a$ and the shorter vertical necks $a'$, and they are formed with the notches $c$ $c'$ a short distance from their lower ends, the notch $c$ being preferably upon the back of the bolt A and the notch $c'$ upon the side of the bolt A'; but this order may be reversed, if desired, or both notches may be made upon the side of the bolts.

The outer ends of the bolts may be formed with the screw-threads $e$ $e'$ to receive the nuts E E', as shown in Fig. 1; or they may be formed with the plain head, as shown at D, Fig. 3, to be used in connection with the divided or forked wedge $d$, (shown in Fig. 4;) or they may be formed with the overhanging head or side arm, F, as shown in Fig. 5, to be used in connection with the wedge $f$, (shown in Fig. 6.)

In securing any object with my new locking-bolts—say the ordinary railroad or horse-car rail, G—the cross-tie H is first to be bored diagonally in such manner that the holes will intersect each other at the proper depth, according to the length of the bolts. The bolts A and A' are then to be inserted in the holes, the bolt A' being inserted first, (if the notches are made in the bolts, as shown in the drawings,) and the nuts or wedges (as the case may be) are then applied to the heads of the bolts for tightening the bolts upon the flanges of the rail, which may be done with great firmness, as the lower ends of the bolts will be securely locked together within the cross-tie.

It will be observed that the bolts have a bearing in the timber both above and below the point where the bolts lock, thus providing additional security against danger of the rail soon becoming loose, so as to move vertically, and obviating almost altogether all danger of lateral canting over or lateral movement of the rail.

If the nuts E E' are to be used for railroad-rails, the plates H H are provided for clamping the flanges of the rails, as shown in Fig. 1; but if the wedges are used these plates are not required. When the bolts are made to be used in connection with the divided wedges the under side of the heads of the bolts will be made diagonal to fit squarely upon the wedges, as shown at $d'$, Fig. 3, and the wedges, after being driven up to tighten the bolts and the rails, may be turned up at the ends, as shown in dotted lines in Fig. 3, to hold the wedges from jarring loose and working out.

In fastening the ends of horse-car rails the bolts are inserted upon both sides of the tread of the rails, and the locks are formed parallel with the rails, as shown in Fig. 7, and the bolts may be inserted in this manner between the ends of the rails, if desired, the holes for their passage through being made close enough together for the size of bolts to be used. Constructed and inserted in this manner, the bolts and rails may be easily tightened by simply driving the wedges or turning the nuts, and the rails may thus be kept always firm and secure, and this without withdrawing the bolts or displacing the rails.

I wish it understood that I do not confine myself to the use of my improved locking-bolts for fastening railroad-rails alone, as they are adapted for many other purposes and uses.

Having thus described my invention, I claim as new and desire to secure by Letters Patent—

1. A locking-bolt bent to form the diagonal portion $a$ and the neck $a'$, and formed with a notch near its lower end, substantially as and for the purposes set forth.

2. The bent bolt A, formed with the notch $c$, in combination with the bent bolt A', formed with the notch $c'$, substantially as and for the purposes set forth.

3. The bent bolts A and A', formed with the notches $c$ and $c'$, in combination with suitable wedges or nuts for tightening the bolts, substantially as and for the purposes set forth.

THOMAS J. BUSH.

Witnesses:
H. A. WEST,
C. SEDGWICK.